United States Patent
Park

(10) Patent No.: US 10,614,985 B2
(45) Date of Patent: Apr. 7, 2020

(54) 3 PHASE UNDERVOLTAGE TRIP DEVICE AND MOLDED CASE CIRCUIT BREAKER THEREWITH

(71) Applicant: LSIS CO., LTD., Gyeonggi-do (KR)

(72) Inventor: Min-Woo Park, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 421 days.

(21) Appl. No.: 15/611,926

(22) Filed: Jun. 2, 2017

(65) Prior Publication Data
US 2018/0190444 A1    Jul. 5, 2018

(30) Foreign Application Priority Data
Jan. 5, 2017  (KR) .................. 10-2017-0001987

(51) Int. Cl.
| | |
|---|---|
| *H01H 9/54* | (2006.01) |
| *H01H 71/12* | (2006.01) |
| *H01H 83/12* | (2006.01) |
| *H02H 3/253* | (2006.01) |

(52) U.S. Cl.
CPC .......... *H01H 71/123* (2013.01); *H01H 83/12* (2013.01); *H02H 3/253* (2013.01)

(58) Field of Classification Search
CPC . H02M 1/06; H02M 3/28; H02H 1/06; H02H 1/063; H02H 1/066; H02H 3/00; H02H 3/18; H02H 9/02
USPC ................. 361/90–93, 85–86, 151–153
See application file for complete search history.

(56) References Cited

U.S. PATENT DOCUMENTS

| | | | | |
|---|---|---|---|---|
| 4,331,996 A | * | 5/1982 | Matsko ............. | H02H 1/06 361/187 |
| 4,788,620 A | * | 11/1988 | Scott ............... | H02H 3/00 324/130 |
| 5,016,135 A | * | 5/1991 | Zylstra ............. | H02H 1/06 361/156 |

(Continued)

FOREIGN PATENT DOCUMENTS

| | | |
|---|---|---|
| CN | 101540249 A | 9/2009 |
| CN | 103166176 A | 6/2013 |

(Continued)

OTHER PUBLICATIONS

European Search Report for related European Application No. 17173189.6; report dated Dec. 1, 2017; (7 pages).

(Continued)

*Primary Examiner* — Tuan T Dinh
(74) *Attorney, Agent, or Firm* — K&L Gates LLP

(57) ABSTRACT

The present disclosure relates to a 3-phase undervoltage trip device capable of automatically tripping a circuit breaker based on an under-voltage of a 3-phase line voltage, including lines to which a 3-phase power is applied. The undervoltage trip device is connected to lines to which a 3-phase power is applied and configured to operate to automatically trip a circuit breaker when an open phase condition occurs on any one of three phases of the power. As the undervoltage trip device automatically trips the circuit breaker when the open phase condition occurs on any one of three phase, occurrence of the open phase condition due to disconnection or an accident on the line may be easily detected.

8 Claims, 3 Drawing Sheets

(56) References Cited

U.S. PATENT DOCUMENTS

| | | | | |
|---|---|---|---|---|
| 5,038,246 | A * | 8/1991 | Durivage | H02H 1/063 361/102 |
| 5,136,458 | A * | 8/1992 | Durivage | H02H 3/00 361/93.2 |
| 5,179,495 | A * | 1/1993 | Zuzuly | H02H 1/063 361/94 |
| 5,668,692 | A * | 9/1997 | Rodgers | H02H 1/063 323/276 |
| 6,038,155 | A * | 3/2000 | Pelly | H02M 1/36 363/125 |
| 6,483,681 | B1 * | 11/2002 | Bauer | H02H 1/066 361/45 |
| 2002/0093778 | A1 | 7/2002 | Meckler | |
| 2004/0264088 | A1 | 12/2004 | Hooper et al. | |
| 2011/0216451 | A1 * | 9/2011 | Haines | B60L 3/0069 361/42 |
| 2015/0365003 | A1 * | 12/2015 | Sadwick | H02M 3/28 363/21.01 |

FOREIGN PATENT DOCUMENTS

| | | |
|---|---|---|
| CN | 103295852 A | 9/2013 |
| CN | 104377645 A | 2/2015 |
| JP | H08111162 A | 4/1996 |
| JP | H0993786 A | 4/1997 |
| JP | 2003302435 A | 10/2003 |
| JP | 3468950 B2 | 11/2003 |
| JP | 2009198442 A | 9/2009 |
| KR | 100883771 B1 | 2/2009 |
| KR | 100943510 B1 | 2/2010 |
| KR | 1020100074829 A | 7/2010 |
| KR | 1020140013646 A | 2/2014 |

OTHER PUBLICATIONS

Korean Office Action for related Korean Application No. 10-2017-0001987; action dated Dec. 7, 2017; (5 pages).
Chinese Office Action for related Chinese Application No. 201710428398.2; action dated Dec. 20, 2018; (14 pages).

* cited by examiner

3 PHASE UNDERVOLTAGE TRIP DEVICE AND MOLDED CASE CIRCUIT BREAKER THEREWITH

CROSS-REFERENCE TO RELATED APPLICATIONS

This application claims the priority of Korean Patent Application No. 10-2017-0001987 filed on Jan. 5, 2017, in the Korean Intellectual Property Office, the disclosure of which is hereby incorporated by reference in its entirety.

BACKGROUND

1. Technical Field

The present disclosure relates to a 3-phase undervoltage trip device for automatically tripping (shutting off) a circuit breaker by detecting an open phase based on undervoltage of a 3-phase line, and a molded case circuit breaker having the same.

2. Description of the Related Art

In general, a molded case circuit breaker (MCCB) is installed in a distribution board in a power reception and distribution facility of a factory, a building, or the like, and serves as a switching device for supplying or interrupting power to the loads in the idling condition. The circuit breaker also serves to cut off power supplied from the power source to the loads in order to protect the wires and the load devices on the line when a large current exceeding the load current flows due to the abnormal condition of the load line during use of the loads.

For this purpose, the MCCB includes an undervoltage trip device capable of tripping a circuit to prevent damage to the circuit and a load device connected to the circuit when the applied voltage drops below a predetermined value due to disconnection or the like.

FIG. 1 is a schematic view of an MCCB equipped with a conventional undervoltage trip device.

As shown in FIG. 1, line voltages of any two phases (e.g., S, T) of the 3 phases (R, S, T) may be applied to a power supply terminal of an undervoltage trip device 110 mounted on a conventional MCCB 100. The undervoltage trip device 110 senses the level of the line voltages of two phases (e.g., S, T) 10 in the energized state. When the line voltages of two phases (S, T) become 35% to 70% of the rated voltage due to an accident on the line and thus undervoltage occurs, the undervoltage trip device 110 trips (shuts off) the circuit to prevent damage to the circuit and the load devices connected to the circuit.

FIG. 2 is a circuit diagram of the conventional undervoltage trip device 110.

Referring to FIG. 2, the conventional undervoltage trip device 110 includes a rectifier 10 for rectifying voltages (alternating current (AC) voltages) of any two phases (e.g., S, T), a voltage divider 11 for dividing the line voltages (direct current (DC) voltage) obtained through rectification in the rectifier 10, a switch 12 which is turned on/off by the divided voltage Vdiv produced by the voltage divider 11, and an excitation coil 13 magnetized or demagnetized according to a current to magnetize (or demagnetize) a circuit-breaking fixed core (not shown).

The voltage divider 11 includes two resistors R1 and R2 connected in series and the divided voltage Vdiv is determined by the resistance ratio of R1 and R2. The rectifier 10 may include a bridge diode, and the switch 12 may include a MOSFET.

When the two-phase (e.g., S, T) voltage is normally applied to the line, the divided voltage Vdiv output from the voltage divider 11 becomes higher than the turn-on voltage of the switch 12 (or gate-source voltage of the MOSFET). When the switch 12 is turned on by the divided voltage Vdiv, the circuit inside the device forms a closed loop, and the energizing current flows through the excitation coil 13. Thus, the excitation coil 13 is magnetized by the energizing current to magnetize a neighboring fixed core, thereby maintaining the circuit in a steady state.

On the other hand, when the two-phase (e.g., S, T) voltage level is lowered (open phase) due to disconnection or the like, the divided voltage Vdiv of the voltage divider 11 becomes lower than the turn-on voltage of the switch 12. When the divided voltage Vdiv becomes lower than the turn-on voltage of the switch 12, the switch 12 is turned off, the internal circuit forms an open loop according to turning-off of the switch 12, and the energizing current passing through the switch 13 is cut off. Therefore, the excitation coil 13 and the fixed core previously magnetized by the energizing current are demagnetized, operating the circuit breaker (not shown). Thereby, the circuit is tripped.

However, since the conventional undervoltage trip device is connected to any two phases (e.g., S, T) of the three phases (R, S, T) to perform a trip operation in the event of disconnection or detection of an accident, it may not recognize disconnection or occurrence of an accident with respect to the other phase R, and thus line trip (shut off) may not be performed for the phase R.

SUMMARY

It is an object of the present disclosure to provide a 3-phase undervoltage trip device capable of stably performing line trip by detecting disconnection or an accident occurring on at least one of 3-phase power lines, and a molded case circuit breaker having the same.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a molded case circuit breaker may include lines to which a 3-phase power is applied and a 3-phase undervoltage trip device connected to lines and configured to operate to automatically trip a circuit when an open phase condition occurs on any one of three phases of the power.

According to an embodiment of the present disclosure, the 3-phase power includes R, S, and T phase powers.

According to an embodiment of the present disclosure, the 3-phase undervoltage trip device may include: a rectifier connected to the lines and configured to rectify the 3-phase power applied to the lines and output 3-phase line voltages; a divider configured to distribute an average voltage of the 3-phase line voltages rectified by the rectifier; an amplifier configured to amplify the average voltage distributed by the divider; a comparator configured to compare the average voltage amplified by the amplifier with a reference voltage and output an open phase detection signal; and a switch turned on or off according to the open phase detection signal of the comparator and operated to supply a current to an excitation coil for tripping the circuit breaker when turned on.

According to an embodiment of the present disclosure, the amplifier may include an OP amplifier, and the switch may include a MOSFET.

According to an embodiment of the present disclosure, the 3-phase undervoltage trip device may further include a phase detector enabled by the open phase detection signal output by the comparator to detect a phase having the open phase condition when the open phase condition occurs.

According to an embodiment of the present disclosure, the open phase detector may include: first and second rectification and division units configured to rectify and divide line voltages of two phases among the line voltages of the three phases; and a second comparator configured to compare the divided voltages from the first and second rectification and division units and outputting a comparison signal indicating a phase having the open phase condition.

According to an embodiment of the present disclosure, the first and second first and second rectification and division units may commonly receive the line voltage of one phase and divide the voltage with the same resistance ratio.

According to the present disclosure, since the circuit can be tripped when the open phase condition occurs on any one of the three phases, occurrence of the open phase condition due to disconnection or an accident on the line may be easily detected. Accordingly, the circuit may be tripped with high accuracy and high stability.

Further, according to the present disclosure, an open phase detection signal that is output from an undervoltage trip device when the open phase condition occurs is used as an enable signal of an open phase detector. Accordingly, the open phase detector may detect a phase that is in the open phase condition, with a high accuracy.

DETAILED DESCRIPTION

Figure 1:
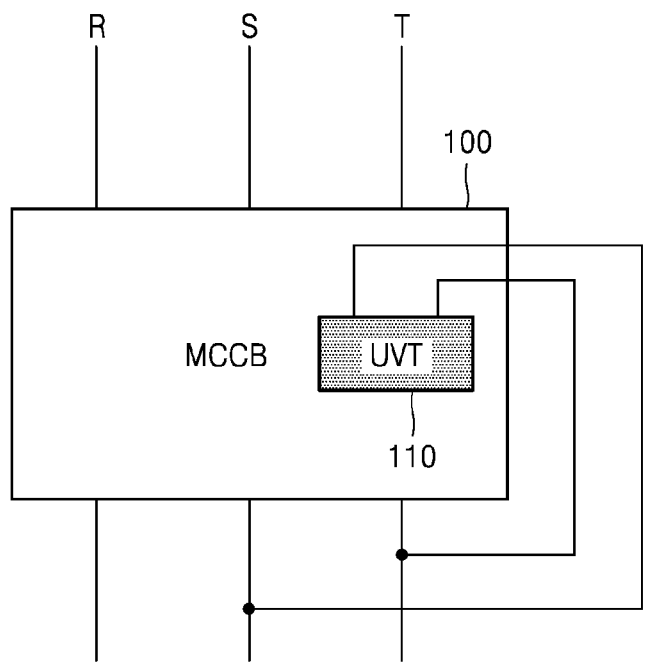
FIG. 1 is a schematic diagram of an MCCB equipped with a conventional undervoltage trip device.
Figure 2:
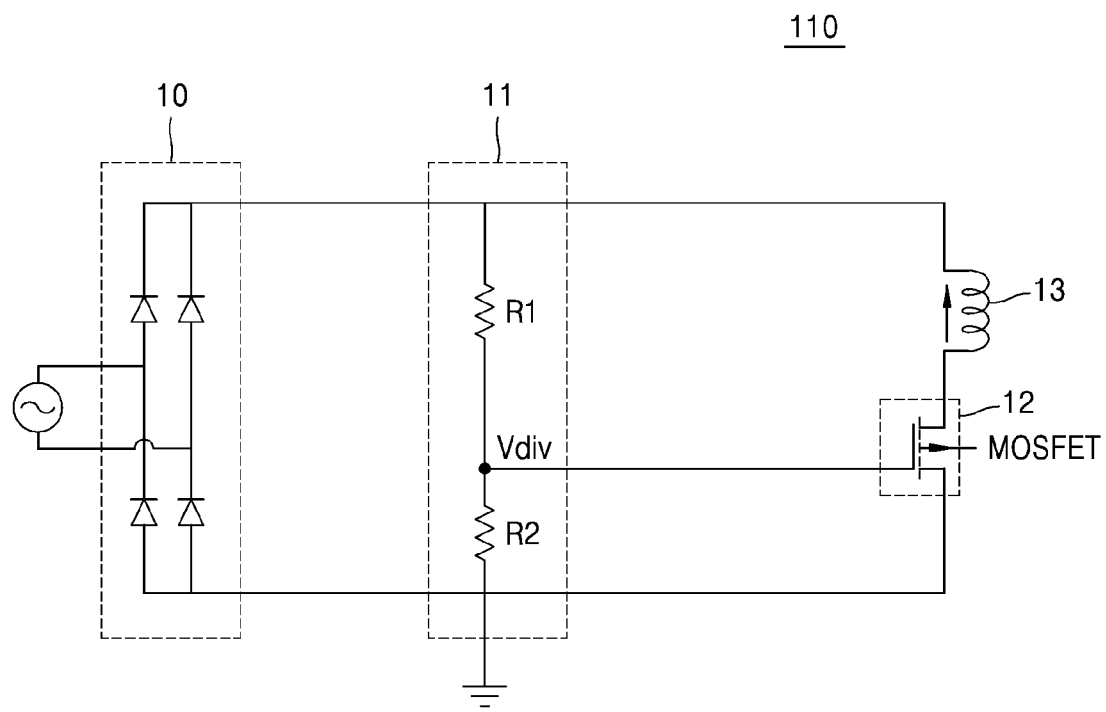
FIG. 2 is a circuit diagram of the conventional undervoltage trip device.

Hereinafter, embodiments of the present disclosure will be described in detail with reference to the accompanying drawings. It should be understood that the present disclosure is not limited to the following embodiments and that the embodiments are provided for illustrative purposes only.

In this specification, the same reference numerals refer to the same or like elements, although the elements are in different embodiments. A redundant description of the elements will be omitted. As used herein, the singular forms "a", "an" and "the" include plural referents unless the context clearly dictates otherwise.

Figure 3:
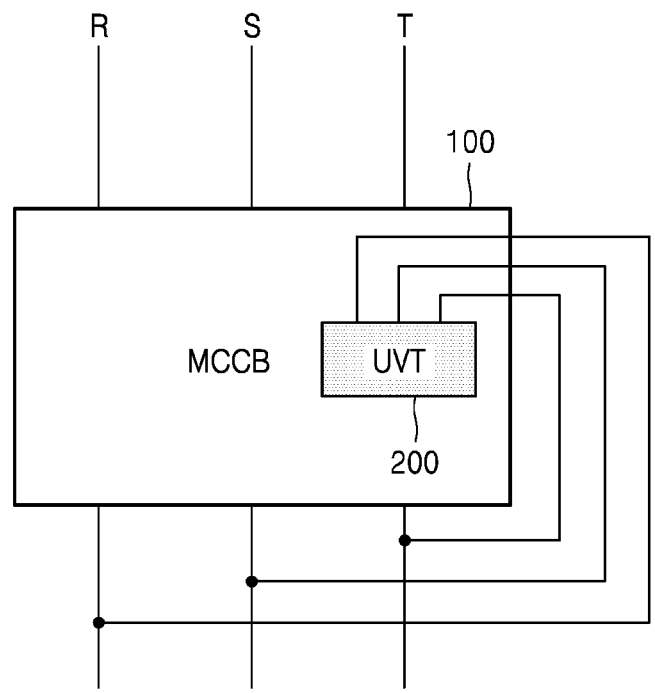
FIG. 3 is a schematic diagram of an MCCB equipped with a 3-phase undervoltage trip device according to an embodiment of the present disclosure.

FIG. 3 is a schematic diagram of an MCCB 100 equipped with a 3-phase undervoltage trip device 200 according to an embodiment of the present disclosure.

As shown in FIG. 3, the 3-phase undervoltage trip device 200 according to an embodiment of the present disclosure is connected to 3-phase (R, S, T) lines to monitor the states of 3-phase line voltages. When the open phase condition occurs on any of the three phases, the 3-phase undervoltage trip device 200 trips (shuts off) the circuit to prevent damage to the circuit and load devices connected to the circuit.

Figure 4:
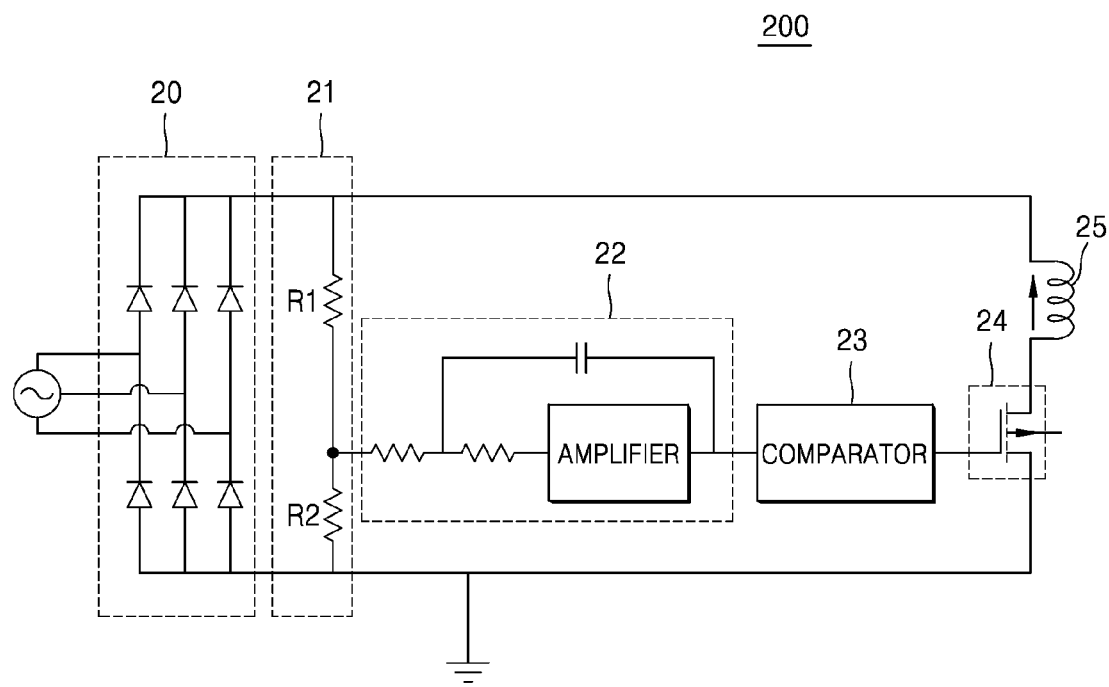
FIG. 4 is a detailed circuit diagram of a 3-phase undervoltage trip device according to an embodiment of the present disclosure.

FIG. 4 is a detailed circuit diagram of the 3-phase undervoltage trip device 200 according to an embodiment of the present disclosure.

Referring to FIG. 4, the 3-phase undervoltage trip device 200 according to the present disclosure includes a rectifier 20 for rectifying 3-phase (R, S, T) line voltages (AC voltages), a voltage divider 21 for dividing the 3-phase line voltages (DC voltages) rectified by the rectifier 20 and outputting an average value thereof, an amplifier 22 for amplifying the voltage average value output from the voltage divider 20, a comparator 23 for comparing the voltage average value output from the amplifier 22 with a reference voltage value and outputting an open phase detection signal, a switch 24 to be turned on/off according to the open phase detection signal output from the comparator 23, an excitation coil (not shown) to be magnetized (or demagnetized) according to a current flowing through turning on/off of the switch 24 to magnetize (or demagnetize) a circuit-breaking fixed core (not shown) for tripping the circuit breaker (not shown).

The rectifier 10 may include a bridge diode.

The voltage divider 21 includes two resistors R1 and R2 connected in series and divides the 3-phase line voltages based on the resistance ratio of the resistors R1 and R2 to output a voltage average value (average line voltage).

The amplifier 22 may include an OP-Amplifier, and the switch 24 may include a MOSFET. However, embodiments of the present disclosure are not limited thereto. Various switches may be included.

Hereinafter, operation of the 3-phase undervoltage trip device 200 according to an embodiment of the present disclosure configured as above will be described.

When the 3-phase (R, S, T) voltages are normally applied to the lines, the 3-phase voltages rectified in the rectifier 20 are divided by the voltage divider 21. At this time, the divided voltage produced by the voltage divider 21 is set to an average value of the 3-phase voltages.

The average line voltage output from the voltage divider 21 is amplified by the amplifier 22 and then input to the comparator 23. The comparator 23 compares the input average line voltage with a preset reference voltage, and outputs a comparison signal of a high level, more specifically, an open phase detection signal indicating that the open phase condition has not occurred.

The reference voltage is set to be smaller than the average line voltage. Therefore, when the 3-phase (R, S, T) voltages are normally applied to the line, the comparator 23 outputs, to the switch 24, a high-level open phase detection signal indicating that the open phase has not been detected, thereby turning on the switch 24, more specifically the MOSFET. When the switch 24 is turned on by the high-level open phase detection signal, the internal circuit forms a closed loop, and thus the energizing current flows through the excitation coil 25. Accordingly, the excitation coil 25 is magnetized by the current to magnetize the neighboring fixed core. Thereby, the circuit maintains the steady state.

On the other hand, if the open phase condition occurs in at least one of the three phases (R, S, T) and the line voltage is lowered, the average line voltage output from the voltage divider 21 after the voltages are rectified by the rectifier 20 and divided by the voltage divider 21 becomes equal to or lower than the reference voltage. As a result, the comparator 23 outputs a low-level comparison signal, more specifically, an open phase detection signal indicating occurrence of the open phase condition, thereby turning off the switch 24.

When the switch 24 is turned off by the low-level open phase detection signal, the internal circuit forms an open loop, and the current flowing through the excitation coil 25 is cut off by turning off the switch 24. Thereby, the excitation coil 25 is demagnetized. When the excitation coil 25 is turned off, the neighboring fixed core is demagnetized. Thereby, the circuit breaker (not shown) is operated and the circuit is tripped.

Figure 5:
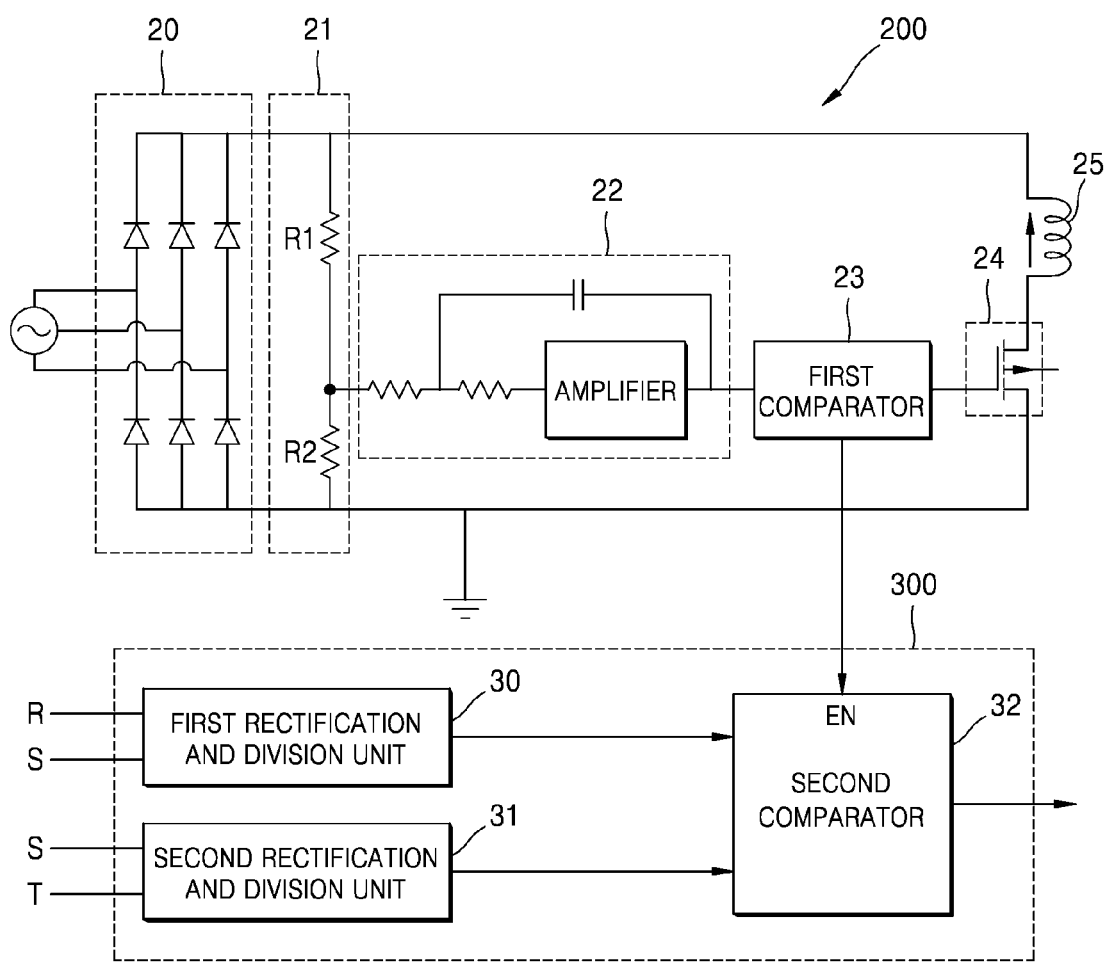
FIG. 5 is a diagram illustrating an application example of a 3-phase undervoltage trip device according to an embodiment of the present disclosure.

FIG. 5 is a diagram illustrating an application example of a 3-phase undervoltage trip device 200 according to an embodiment of the present disclosure.

As shown in FIG. 5, the open phase detection signal output from the 3-phase undervoltage trip device 200 of the present disclosure may be used as an operation signal of an open phase detector 300, which detects a phase on which the open phase condition has occurred.

The open phase detector 300 may include first and second rectification and division units 30 and 31 for rectifying and dividing line voltages of two phases and a second comparator 32 for comparing the divided voltages produced by the first and second rectification and division units 30 and 31 and outputting a comparison signal indicating a phase on which the open phase condition has actually occurred.

The first and second rectification and division units 30 and 31 receive a line voltage of one phase in common among the 3-phase line voltages. Here, the same resistance ratio for dividing the voltages is set.

In this embodiment, the first and second rectification and division units 30 and 31 receive the line voltage of the S phase in common. The first rectification and division unit 30 receives the line voltages of the R and S phases, and the second rectification and division unit 31 receives the line voltages of the S and T phases.

The second comparator 300 is enabled (or triggered) according to the low-level comparison signal output from the first comparator 23 of the 3-phase undervoltage trip device 200, and compares the divided voltage from the first rectification with division unit 30 and the divided voltage from the second rectification and division unit 31 to determine the higher one of the divided voltages.

Accordingly, when the open phase condition is detected on any of three phases, the 3-phase undervoltage trip device 200 according to the present disclosure may control the circuit breaker to trip the circuit, and at the same time, output a low-level comparison signal, more specifically, the open phase detection signal to the open phase detection unit 300 to enable the open phase detection unit 300.

Since the first and second rectification with division units 30 and 31 of the open phase detector 300 receive the line voltage of one phase in common among the 3-phase line voltages, it is possible to know the phase on which the open phase condition has occurred according to the result of comparison.

For example, when the R phase is an open phase, the divided voltage output from the first rectification and division unit 30 is lower than the divided voltage output from the second rectification and division unit 31, and thus the second comparator 32 outputs a low-level comparison signal. When the T phase is an open phase, the second comparator 32 outputs a high-level comparison signal using the same method.

When the S phase is an open phase, the divided voltage output from the first rectification with division unit 30 and the divided voltage output from the second rectification and division unit 31 are almost equal to each other, and accordingly no output is generated from the second comparator 32.

Therefore, a phase on which the open phase condition occurs may be easily recognized, based on the comparison signal output from the second comparator 32. By using the comparison signal, a circuit or device using two-phase line voltages may stably perform line switching.

In summary, the 3-phase undervoltage trip device 200 of this embodiment may determine whether or not the open phase condition has occurred on at least one of the three phases through the first comparator 23, and determine a phase having the open phase condition among the three phases, through the second comparator 23.

In the present embodiment, two rectification and division units have been described as an example, but the present disclosure is not limited thereto. As another example, three or more rectification and division units may be provided, and the second comparator 32 may compare the output voltages of the plurality of rectification and division units to detect a phase on which the open phase condition has occurred among the phases connected to the rectification and division units.

As described above, the 3-phase undervoltage trip device of this embodiment may operate to trip the circuit when the open phase condition occurs on any one of the three phases. Therefore, the 3-phase undervoltage trip device may detect occurrence of the open phase condition caused by disconnection or an accident on the line, with high accuracy and may be effectively applied to line switching or the like.

The 3-phase undervoltage trip device and the circuit breaker having the same according to the present disclosure described above are not limited to the configurations and methods of the embodiments described above. It will be understood that the disclosure may be embodied in other specific forms without departing from the spirit or scope of the disclosure. Therefore, it should be understood that the above-described embodiments are to be considered in all respects as illustrative and not restrictive.

The present disclosure described above may be variously substituted, altered, and modified by those skilled in the art to which the present invention pertains without departing from the scope and spirit of the present disclosure. Therefore, the present disclosure is not limited to the above-mentioned exemplary embodiments and the accompanying drawings. The scope of the invention should be defined only by the accompanying claims and equivalents thereof.

What is claimed is:

1. A 3-phase undervoltage trip device comprising:
   a rectifier connected to lines of three phases and configured to rectify a 3-phase power applied to the lines and output line voltages of the three phases;
   a divider configured to distribute an average voltage of the line voltages of the three phases rectified by the rectifier;
   an amplifier configured to amplify the average voltage distributed by the divider;
   a comparator configured to compare the average voltage amplified by the amplifier with a reference voltage and output an open phase detection signal;
   a switch turned on or off according to the open phase detection signal of the comparator and configured to supply a current to an excitation coil for tripping a circuit breaker when turned on; and an open phase detector enabled by the open phase detection signal output by the comparator to detect a phase having an open phase condition, wherein the open phase detector comprises:

first and second rectification and division units configured to rectify and divide line voltages of two phases among the line voltages of the three phases; and a second comparator configured to compare the divided line voltages from the first and second rectification and division units and output a comparison signal indicating a phase having the open phase condition.

2. The 3-phase undervoltage trip device according to claim 1, wherein the amplifier comprises an OP amplifier, and the switch comprises a MOSFET.

3. The 3-phase undervoltage trip device according to claim 1, wherein a one line voltage of a one phase among the line voltages of the two phases rectified and divided by the first and second rectification and division units is the same between the first and second rectification and division units, and the first and second rectification and division units divide the line voltages of the two phases with the same resistance ratio.

4. The 3-phase undervoltage trip device according to claim 1, wherein the second comparator compares the divided line voltage from the first rectification and division unit with the divided line voltage from the second rectification and division unit to identify a higher one among the divided voltages from the first and second rectification and division units.

5. A molded case circuit breaker comprising;

lines to which a 3-phase power is applied; and a 3-phase undervoltage trip device connected to the lines and configured to automatically trip a circuit when an open phase condition occurs on any one of three phases of the 3-phase power, wherein the 3-phase undervoltage trip device comprises:

a rectifier connected to the lines and configured to rectify the 3-phase power applied to the lines and output line voltages of the three phases;

a divider configured to distribute an average voltage of the line voltages of the three phases rectified by the rectifier;

an amplifier configured to amplify the average voltage distributed by the divider;

a comparator configured to compare the average voltage amplified by the amplifier with a reference voltage and output an open phase detection signal;

a switch turned on or off according to the open phase detection signal of the comparator and configured to supply a current to an excitation coil for tripping the molded case circuit breaker when turned on; and an open phase detector enabled by the open phase detection signal output by the comparator to detect a phase having an open phase condition, wherein the open phase detector comprises:

first and second rectification and division units configured to rectify and divide line voltages of two phases among the line voltages of the three phases; and a second comparator configured to compare the divided line voltages from the first and second rectification and division units and output a comparison signal indicating a phase having the open phase condition.

6. The circuit breaker according to claim 5, wherein the amplifier comprises an OP amplifier, and the switch comprises a MOSFET.

7. The circuit breaker according to claim 5, wherein a one line voltage of a one phase among the line voltages of the two phases rectified and divided by the first and second rectification and division units is the same between the first and second rectification and division units, and the first and second rectification and division units divide the line voltages of the two phases with the same resistance ratio.

8. The circuit breaker according to claim 5, wherein the second comparator compares the divided line voltage from the first rectification and division unit with the divided line voltage from the second rectification and division unit to identify a higher one among the divided line voltages from the first and second rectification and division units.

* * * * *